United States Patent
Ngoc

(10) Patent No.: US 7,973,104 B2
(45) Date of Patent: *Jul. 5, 2011

(54) RUBBERY CORE/SHELL POLYMER WITH IMPROVED HEAT AND UV RESISTANCE

(75) Inventor: Hung Dang Ngoc, Limeil Brevannes (FR)

(73) Assignee: Eliokem S.A.S., Villejust (FR)

( * ) Notice: Subject to any disclaimer, the term of this patent is extended or adjusted under 35 U.S.C. 154(b) by 566 days.

This patent is subject to a terminal disclaimer.

(21) Appl. No.: 11/478,209

(22) Filed: Jun. 29, 2006

(65) Prior Publication Data

US 2006/0247358 A1    Nov. 2, 2006

Related U.S. Application Data

(60) Continuation-in-part of application No. 11/145,402, filed on Jun. 3, 2005, now Pat. No. 7,407,572, which is a division of application No. 10/740,250, filed on Dec. 18, 2003, now Pat. No. 6,984,686.

(30) Foreign Application Priority Data

Dec. 19, 2002  (EP) .................................. 02 293 160

(51) Int. Cl.
    *C08F 2/16*  (2006.01)
(52) U.S. Cl. ........ 524/458; 525/243; 525/261; 525/262; 525/304; 525/305; 525/309; 525/380; 525/50; 526/66; 526/88; 526/225; 524/461; 524/504; 524/515; 524/517; 524/527
(58) Field of Classification Search .................. 524/458, 524/501–504; 525/71, 81, 85, 245, 281, 525/309

See application file for complete search history.

(56) References Cited

U.S. PATENT DOCUMENTS

| | | | | |
|---|---|---|---|---|
| 3,833,683 A | | 9/1974 | Dickie et al. .................. 260/836 |
| 4,129,608 A | | 12/1978 | Murayama et al. ............ 260/836 |
| 4,680,335 A | * | 7/1987 | Chambers et al. ............ 524/501 |
| 4,721,757 A | * | 1/1988 | Schindler ...................... 525/245 |
| 4,876,313 A | * | 10/1989 | Lorah ............................ 525/281 |
| 5,194,498 A | * | 3/1993 | Stevenson et al. .............. 525/81 |
| 5,252,666 A | | 10/1993 | Seitz et al. ....................... 525/80 |
| 5,367,029 A | | 11/1994 | Fischer et al. ................. 525/301 |
| 5,380,785 A | * | 1/1995 | Ngoc et al. ..................... 524/504 |
| 5,415,940 A | | 5/1995 | Ngoc et al. .................. 428/424.4 |
| 5,442,012 A | * | 8/1995 | Kempner et al. ................ 525/71 |
| 5,504,155 A | | 4/1996 | Ngoc et al. ...................... 525/70 |
| 5,504,160 A | | 4/1996 | Ngoc et al. ..................... 525/274 |
| 5,612,413 A | * | 3/1997 | Rozkuszka et al. ............. 525/85 |
| 5,616,651 A | | 4/1997 | Nino et al. ..................... 525/305 |
| 5,773,520 A | * | 6/1998 | Bertelo et al. ................. 525/309 |
| 5,962,591 A | * | 10/1999 | Ngoc et al. .................... 525/229 |
| 6,031,051 A | * | 2/2000 | Wu ................................ 525/243 |
| 6,077,903 A | * | 6/2000 | Ngoc .............................. 525/53 |
| 6,337,374 B1 | * | 1/2002 | Ngoc et al. .................... 525/226 |
| 6,476,128 B1 | | 11/2002 | Berzinis .......................... 525/70 |
| 6,984,686 B2 | * | 1/2006 | Ngoc ............................ 524/458 |
| 7,094,824 B2 | * | 8/2006 | Ngoc ............................ 524/458 |

FOREIGN PATENT DOCUMENTS

WO    WO 01 74944 A    10/2001

* cited by examiner

*Primary Examiner* — Mark Eashoo
*Assistant Examiner* — Michael A Salvitti
(74) *Attorney, Agent, or Firm* — Alvin T. Rockhill

(57) ABSTRACT

The present invention relates to rubbery core/shell polymers that have improved heat and ultraviolet light resistance. These polymers can be blended with thermoplastics to make leathery compositions. The core/shell polymers of this invention have an inner core and an outer shell. The inner core is has repeat units which are derived from (a) butyl acrylate, (b) a member selected from the group consisting of methyl methacrylate, ethyl methacrylate, methyl acrylate, and ethyl acrylate, (c) optionally, an alkoxy ethyl acrylate or an alkoxy ethyl methacrylate, (d) acrylonitrile, (f) a cross-linking agent, and (g) a monomer containing reactive cure sites The outer core has repeat units which are derived from (d) acrylonitrile, (e) styrene, and (f) additional cross-linking agent. The outer core of these polymers is void of repeat units that are derived from methyl methacrylate.

20 Claims, No Drawings

RUBBERY CORE/SHELL POLYMER WITH IMPROVED HEAT AND UV RESISTANCE

This is a continuation-in-part application of U.S. patent application Ser. No. 11/145,402, filed on Jun. 3, 2005, now U.S. Pat. No. 7,407,572 which is a divisional of U.S. patent application Ser. No. 10/740,250, filed on Dec. 18, 2003 (now issued as U.S. Pat. No. 6,984,686).

BACKGROUND OF THE INVENTION

Automotive instrument panels and door panels are typically composites which are made of a rigid backing which supports a semi-rigid urethane foam with the semi-rigid urethane foam being covered with a skin compound. Such skin compounds are typically blends of polyvinyl chloride (PVC) with a nitrile rubber (NBR). The nitrile rubber is included in such blends as a permanent modifier for the PVC which provides it with a higher degree of flexibility.

The automotive industry is currently moving toward more aerodynamic body designs which typically include larger glass areas. Such design changes have significantly increased the heat and ultraviolet light aging requirements of automotive interiors. This has in turn significantly increased the demands put upon the polymers which are utilized as skins in automotive interior panels.

Heat and light stabilizers can be employed to improve the heat and ultraviolet light aging characteristics of conventional PVC/NBR blends which are utilized as skins for automotive interior panels.

However, the degree to which the aging characteristics of such blends can be improved by the addition of additives is limited. In fact, there is a demand for performance characteristics in such applications which theretofore has not been realized by the utilization of heat and light stabilizers. For instance, it would be highly desirable for the skins used in automotive panels to resist discoloration and cracking under conditions of high heat and intense ultraviolet light throughout the life of the vehicle.

NBR/PVC blends offer an array of physical properties which make them useful as a skin composition for automotive panels. The NBR acts as a permanent flexibilizing polymer for the PVC. It also acts as a shrinkage control agent and embossing aid and improves grain retention. The NBR in such blends further provides vacuum forming gauge control and exhibits low fog characteristics. NBR is highly compatible with PVC and has the capability of being recycled. It is essential for any polymer which is substituted for NBR to display these essential characteristics.

U.S. Pat. No. 5,380,785, U.S. Pat. No. 5,415,940, U.S. Pat. No. 5,504,155, U.S. Pat. No. 5,504,160 and U.S. Pat. No. 5,616,651 disclose a rubbery polymer which can be blended with PVC to make leathery compositions. These compositions are particularly useful in manufacturing skins for automotive interior paneling. Skin compositions which are made utilizing this rubbery polymer provide a higher level of resistance to heat and ultraviolet light than those made utilizing conventional NBR/PVC blends. The rubbery polymers of U.S. Pat. No. 5,380,785 also offer low fog characteristics; low odor, shrinkage control, and grain retention. They also act as an embossing aid and as a permanent flexibilizing modifier. These rubbery polymers also have characteristics which make them useful in building gasket applications.

U.S. Pat. No. 5,380,785 also specifically discloses a rubbery polymer which can be blended with polyvinyl chloride to make leathery compositions having good heat and ultraviolet light resistance, said rubbery polymer being comprised of repeat units which are comprised of (a) butyl acrylate, or optionally a mixture of butyl acrylate and 2-ethylhexyl acrylate containing up to about 40% 2-ethylhexyl acrylate, (b) at least one member selected from the group consisting of methyl methacrylate, ethyl methacrylate, methyl acrylate, and ethyl acrylate, (c) acrylonitrile, (d) styrene, (e) a half ester maleate soap, and (f) a crosslinking agent. Polymers of this general type are sold by Eliokem as SUNIGUM® rubber.

U.S. Pat. No. 5,962,591 discloses that blends of certain rubbery polymers with polyolefins can be compatibilized with ethylene alkyl acrylates or ethylene vinyl acetate. These blends can be made so as to be useful as skins for automotive interior panels and can be made so as to be leathery in nature.

SUMMARY OF THE INVENTION

The present invention relates to a rubbery polymer which can be blended with polyvinylchloride (PVC), halogen containing polymers, polyurethanes, styrenic polymers (polymers which contain styrene such as acrylonitrile butadiene styrene (ABS), acrylonitrile styrene acrylate (ASA), styrene ethylene butadiene styrene (SEBS), etc.), polyesters and copolymers ester-ether (COPE), polyamides, polycarbonates, as well as polyolefins via compatibilization techniques to make leathery compositions.

The compositions according to the invention are particularly useful in manufacturing skins for automotive interior paneling. Skin compositions which are made utilizing this rubbery polymer provide a higher level of resistance to heat and ultraviolet light than those made utilizing conventional NBR/PVC blends. The rubbery polymers of this invention also offer low fog characteristics, low odor, shrinkage control, and grain retention. They also act as an embossing aid and as a permanent flexibilizing modifier. The rubbery polymers of this invention also have characteristics which made them useful in building gasket applications.

The present invention more specifically discloses a rubbery polymer having improved properties, which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate, and ethyl acrylate, (c) optionally, about 0% to about 40% of an alkoxy ethyl acrylate or an alkoxy ethyl methacrylate, (d) acrylonitrile, (e) styrene, and (f) a crosslinking agent; wherein about 1% to about 10% of a monomer containing reactive cure sites selected from the group consisting of hydroxyl groups, glycidyl groups, carboxylic acid groups, and unsaturated cure sites is incorporated into the rubbery polymer.

The present invention further discloses a process for preparing a rubbery polymer which can be blended with thermoplastics to make leathery compositions having good heat and ultraviolet light resistance, said process comprising the steps of (1) polymerizing (a) butyl acrylate, or optionally a mixture of butyl acrylate and 2-ethylhexyl acrylate containing up to about 40% 2-ethylhexyl acrylate, (b) at least one member selected from the group consisting of methyl methacrylate, ethyl methacrylate, methyl acrylate, and ethyl acrylate, (c) optionally about 0% to about 40% of alkoxy ethyl me(acrylate), (d) acrylonitrile, and (e) a crosslinking agent; wherein about 1% to about 10% of a monomer containing reactive cure sites selected from the group consisting of hydroxyl groups, glycidyl groups, carboxylic acid groups, and unsaturated cure sites is incorporated into the rubbery polymer under emulsion polymerization conditions to produce a seed polymer containing latex; (2) adding (a) styrene, (b) additional acrylonitrile, and (c) additional crosslinking agent to the seed polymer containing latex under emulsion polymerization conditions which result in the formation of an emulsion containing the rubbery polymer; (3) recovering the rubbery polymer from the emulsion containing the rubbery polymer.

DETAILED DESCRIPTION OF THE INVENTION

The present invention discloses a rubbery polymer which can be blended with PVC, halogen containing polymers, polyurethanes, styrenic polymers (polymers which contain styrene such as ABS, ASA, SEBS, etc.), polyesters and copolymers ester-ether (COPE), polyamides, polycarbonates, as well as polyolefins via compatibilization techniques to make leathery compositions having good heat and ultraviolet light resistance, said rubbery polymer being comprised of repeat units which are comprised of (a) butyl acrylate, or optionally a mixture of butyl acrylate and 2-ethylhexyl acrylate containing up to about 40% 2-ethylhexyl acrylate, (b) at least one member selected from the group consisting of methyl methacrylate, ethyl methacrylate, methyl acrylate, and ethyl acrylate, (c) optionally, about 0 to about 40% of alkoxy ethyl me(acrylate), (d) acrylonitrile, (e) styrene, and (f) a crosslinking agent; wherein about 1 to about 10% of a reactive cure site (co)monomer containing hydroxyl groups, glycidyl groups, carboxylic acid groups, or unsaturated cure site is incorporated during emulsion polymerization onto said rubbery polymer.

Advantageously, such rubbery polymers contain repeat units (chain linkages) which are derived from (a) butyl acrylate, or optionally a mixture of butyl acrylate and 2-ethylhexyl acrylate containing up to about 40% 2-ethylhexyl acrylate, (b) at least one member selected from the group consisting of methyl methacrylate, ethyl methacrylate, methyl acrylate, and ethyl acrylate, (c) optionally, about 0 to about 40% of alkoxy ethyl me(acrylate), (d) acrylonitrile, (e) styrene, and (f) a crosslinking agent; wherein (g) about 1 to about 10% of a reactive cure site (co)monomer containing hydroxyl groups, glycidyl groups, carboxylic acid groups, or unsaturated cure site is incorporated during emulsion polymerization onto said rubbery polymer.

These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers in actuality means that it contains repeat units which are derived from those monomers.

The rubbery polymers, which are modified in accordance with this invention, will normally contain (a) from about 40 to about 80% by weight butyl acrylate, or optionally a mixture of butyl acrylate and 2-ethylhexyl acrylate containing up to 40% by weight 2-ethylhexyl acrylate, (b) from about 5 to about 35% by weight methyl methacrylate, ethyl methacrylate, methyl acrylate, or ethyl acrylate, (c) optionally about 0 to about 40% of alkoxy ethyl me(acrylate), (d) from about 4 to about 30% by weight acrylonitrile, (e) from about 3 to about 25% by weight styrene, (f) from about 0.25 to about 8% by weight of a crosslinking agent wherein (g) from about 0.1 to about 10% by weight of a reactive cure site (co)monomer containing hydroxyl groups, glycidyl groups, carboxylic acid groups, or unsaturated cure site is incorporated during emulsion polymerization onto said rubbery polymer.

Such rubbery polymers will preferably contain (a) from about 50 to about 80% by weight butyl acrylate, or optionally a mixture of butyl acrylate and 2-ethylhexyl acrylate containing up to about 40% 2-ethylhexyl acrylate, (b) from about 3 to about 25% by weight of at least one member selected from the group consisting of methyl methacrylate, ethyl methacrylate, methyl acrylate, and ethyl acrylate, (c) optionally, about 0 to about 40% of alkoxy ethyl me(acrylate), (d) from about 6 to about 30% by weight acrylonitrile, (e) from about 5 to about 18% by weight styrene, (f) from about 0.5 to about 4% by weight of a crosslinking agent wherein (g) from about 1 to about 8% by weight of a reactive cure site (co)monomer containing hydroxyl groups, glycidyl groups, carboxylic acid groups, or unsaturated cure site is incorporated during emulsion polymerization onto said rubbery polymer.

The rubbery polymer will more preferably be comprised of repeat units which are derived from (a) from about 55 to about 75% by weight butyl acrylate, or optionally a mixture of butyl acrylate and 2-ethylhexyl acrylate containing up to about 40% 2-ethylhexyl acrylate, (b) from about 5 to about 20% by weight of at least one member selected from the group consisting of methyl methacrylate, ethyl methacrylate, methyl acrylate, and ethyl acrylate, (c) optionally about 0 to about 40% of alkoxy ethyl me(acrylate), (d) from about 10 to about 25% by weight acrylonitrile, (e) from about 8 to about 14% by weight styrene, (f) from about 1 to about 3% by weight of a crosslinking agent wherein (g) from about 2 to about 6% by weight of a reactive cure site (co)monomer containing hydroxyl groups, glycidyl groups, carboxylic acid groups, or unsaturated cure site is incorporated during emulsion polymerization onto said rubbery polymer. These percentages are based upon the total weight of the rubbery polymer.

A variety of reactive cure site (co)monomers can be used in carrying out the polymerizations to produce the rubbery polymer. These monomers contain reactive cure sites which are selected from the group consisting of hydroxyl groups, glycidyl groups, carboxyl groups, and unsaturated cure sites.

Some representative examples of monomers containing reactive cure sites which can be utilized include carboxyl derivatives such as acrylic or methacrylic acid, maleic acid, fumaric acid and itaconic acid; hydroxy derivatives such as 2-hydroxyethyl (me)acrylate, 2-hydroxypropyl (me)acrylate, 3-hydroxypropyl (me)acrylate, 2-hydroxyethyl crotonate, pentahydroxyethyl (me)acrylate, 2,3,4,5-tetrahydroxy-pentyl (me)acrylate, etc. The particularly preferable monomers are acrylic acid, methacrylic acid, 2-hydroxyethyl acrylate, and hydroxyethyl methacrylate.

Some representative examples of glycidyl derivatives which can be utilized include glycidyl (me)acrylate, allyl glycidyl ether, itaconic acid monoglycidyl ester, butenetricarboxylic acid monoglycidyl ester, butenetricarboxylic acid diglycidyl ester, butenetricarboxylic acid triglycidyl ester, vinyl glycidyl ethers and esters of maleic acid, fumaric acid and crotonic acid, etc. The particularly preferable monomers are glycidyl (me)acrylate and allyl glycidyl ether.

Some representative examples of monomers containing unsaturated cure sites can be utilized include 1,3-butadiene, isoprene, allyl maleate, tetrahydrobenzyl acrylate, diallyl phthalate, dicyclopentenyl acrylate, dicyclopentenyloxyethyl methacrylate, and the like. When the reactive cure site is an unsaturated cure site, sulfur vulcanization with or without accelerator or other vulcanization agents such as phenolic curatives, benzoquinone derivatives, metal oxides, organic peroxides and bismaleimides can be used to improve the polymer network during processing as described by A. Y. Coran in *Encyclopedia of Polymer Science and Engineering*, 17 (Second Edition), 666-698. When the reactive cure sites are carboxy derivatives, hydroxy derivatives or glycidyl derivatives, chemical reactions are more preferable to improve compatiblization or polymer network during processing or polymer blending.

The present invention further reveals a leathery composition that is useful in automotive applications which is comprised of (1) a thermoplastic such as PVC, halogen containing polymers, polyurethanes, styrenic polymers (polymers which contain styrene such as ABS, ASA, SEBS, etc.), polyesters and copolymers ester-ether (COPE), polyamides, polycarbonates, as well as polyolefins via compatibilization techniques, (2) a plasticizer, and (3) a rubbery polymer which is comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate, and ethyl acrylate, (c) optionally, about 0 to about 40% of alkoxy ethyl me(acrylate), (d) acrylonitrile, (e) styrene, and (f) a crosslinking agent; wherein about 1 to about 10% of a reactive cure site (co)monomer containing hydroxyl groups, glycidyl groups, carboxylic acid groups, or unsaturated cure site is incorporated during emulsion polymerization onto said rubbery polymer.

These leathery compositions offer an excellent combination of properties for utilization in making skin compounds for panels used in automotive applications. These leathery compositions can be prepared by blending the rubbery polymer into polyvinylchloride (PVC) utilizing standard mixing techniques. It is highly preferred for the improved rubbery polymer of this invention to be in powdered form when blended into PVC to make such leathery compositions. A wide variety of plasticizers which are compatible with the polyvinyl chloride resins can be employed.

Such leathery compositions typically contain from about 40 to 160 parts by weight of the improved rubbery polymer of this invention, from about 10 to about 50 parts of a plasticizer, and from about 0.1 to about 5 parts by weight of an antidegradant per 100 parts by weight of the polyvinylchloride. It is typically preferred for such leathery compositions to contain from about 60 to about 120 parts by weight of the improved rubbery polymer of this invention, from about 15 to about 40 parts of the plasticizer, and from about 0.5 to 3 parts of an antidegradant (per 100 parts of the PVC). It is typically more preferred for the leathery composition to contain from about 70 to about 90 parts by weight of the improved rubbery polymer of this invention, from about 20 to about 30 parts by weight of the plasticizer, and from about 1 to 2 parts by weight of the antidegradant per 100 parts by weight of the PVC. Such compositions will also generally contain an acrylonitrile-butadiene-styrene resin (ABS resin).

The leathery composition will typically contain from about 15 parts to about 80 parts of ABS resin per 100 parts of PVC. The leathery composition will preferably contain from about 25 to about 55 parts per weight of the ABS resin per 100 parts by weight of the PVC. It is generally more preferred for the leathery composition to contain from about 30 to about 40 parts by weight of the ABS resin per 100 parts by weight of PVC. Various colorants and/or pigments will typically also be added to the composition to attain a desired color.

The leathery compositions of this invention are useful in a wide variety of applications. For example, they have been found to be extremely valuable when used in making skins for automotive panels. Such panels are typically comprised of a semi-rigid urethane foam which is supported by a rigid backing and covered with the leathery composition of this invention. Such skins are made by calendaring the leathery compositions of this invention and then cutting them to the desired size and shape. Such skins for automotive applications which are made with the leathery compositions of this invention offer outstanding heat and ultraviolet light stability. These are highly desirable characteristics which can help to prevent the skin of automotive panels from cracking during the normal life of the vehicle.

The improved rubbery polymers of this invention can also be blended with other halogen containing polymers (in addition to PVC), styrenic polymers (polymers which contain styrene, such as acrylonitrile-styrene-acrylate (ASA) polymers, ABS, SEBS polymers, etc.), polyesters and copolyester-ether, polycarbonates, polyamides, polyurethanes, polyolefins to produce compositions which exhibit good heat and ultraviolet light resistance. Such polymeric compositions can be used in manufacturing a wide variety of useful articles, such as profiles, moldings, sheeting, flooring, wall coverings, hose, cables, and footwear. Virtually any type of polyamide (nylon) can be utilized in preparing such blends. These nylons are generally prepared by reacting diamines with dicarboxylic acids. The diamines and dicarboxylic acids which are utilized in preparing such nylons will generally contain from about 2 to about 12 carbon atoms. However, nylons which can be utilized in such blends can also be prepared by addition polymerization. Some representative examples of nylons which can be used include nylon-6,6, nylon-6, nylon-7, nylon-8, nylon-9, nylon-10, nylon-11, nylon-12 and nylon-6, 12. Some representative examples of polyolefins which can be used include low density polyethylene, linear low density polyethylene, high density polyethylene, polypropylene, metallocene catalyzed polyolefins, and modified polyolefins, such as ethylene vinyl acetate (EVA), ethylene-alkyl (me) acrylate or terpolymers of ethylene, alkyl (me)acrylate and acrylic acid.

The present invention further discloses a process for preparing a rubbery polymer which can be blended with PVC, halogen containing polymers, polyurethanes, styrenic polymers (polymers which contain styrene such as ABS, ASA, SEBS, etc.), polyesters and copolymers ester-ether (COPE), polyamides, polycarbonates, as well as polyolefins via compatibilization techniques to make leathery compositions having good heat and ultraviolet light resistance, said process comprising the steps of (1) polymerizing (a) butyl acrylate, or optionally a mixture of butyl acrylate and 2-ethylhexyl acrylate containing up to about 40% 2-ethylhexyl acrylate, (b) at least one member selected from the group consisting of methyl methacrylate, ethyl methacrylate, methyl acrylate, and ethyl acrylate, (c) optionally, about 0 to about 40% of alkoxy ethyl me(acrylate), (d) acrylonitrile, and (e) a crosslinking agent; wherein about 1 to about 10% of a reactive cure site (co)monomer containing hydroxyl groups, glycidyl groups, carboxylic acid groups, or unsaturated cure site is incorporated under emulsion polymerization conditions to produce a seed polymer containing latex; (2) adding (a) styrene, (b) additional acrylonitrile, and (c) additional crosslinking agent to the seed polymer containing latex under emulsion polymerization conditions which result in the formation of an emulsion containing the rubbery polymer; (3) recovering the rubbery polymer from the emulsion containing the rubbery polymer.

The rubbery polymers which are modified in accordance with the process of the present invention are synthesized in an aqueous reaction mixture by utilizing a free radical polymerization technique. The reaction mixture utilized in this polymerization technique is comprised of water, the appropriate monomers, a suitable free radical initiator, a crosslinking agent, and a soap.

A wide variety of soaps (emulsifiers) can be utilized in carrying out the polymerization to produce the rubbery polymer. Some representative examples of soaps which can be utilized include the half ester maleate soap, and/or the metal salt of an alkyl sulfonate or the metal salt of an alkyl sulfate.

The half ester maleate soap utilized in the polymerization is prepared by reacting maleic anhydride with a fatty alcohol containing from about 10 to about 24 carbon atoms. It is typically preferred to utilize a fatty alcohol which contains from about 12 to about 16 carbon atoms. One mole of the maleic anhydride is reacted with one mole of the fatty alcohol in producing the half ester maleate soap. This reaction is typically conducted at a temperature that is within the range of about 50° C. to about 80° C. Sodium hydroxide or potassium hydroxide is then added to make the half ester maleate soap.

Some representative examples of sulfonate and sulfate surfactants which can be used include sodium toluene-xylene sulfonate, sodium toluene sulfonate, sodium cumene sulfonate, sodium decyldiphenyl ether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate. Metal salts of alkylbenzene sulfonates are a highly preferred class of sulfonate surfactant. The metal will generally be sodium or potassium.

The sulfonate surfactant can be a mixture of (mono)dialkylate ether disulfonates. The advantage of the disulfonate structure is that it contains two ionic charges per molecule instead of one as in the case with conventional alkyl sulfonate surfactants.

The sulfate surfactants, which are useful in the practice of this invention, include metal salts of alkylsulfates having the structural formula $ROSO_3X$ and metal salts of alkylethersulfates having the structural formula $RO(CH_2CH_2O)_nSO_3X$, wherein R represents an alkyl group and wherein X represents sodium or potassium. Sodium lauryl sulfate, sodium ethanolamine lauryl sulfate, triethanolamine lauryl sulfate are representative examples of commercially available sulfate surfactants.

The reaction mixture utilized in this polymerization technique will normally contain from about 10 to about 80% by weight monomers, based upon the total weight of the reaction mixture. The reaction mixture will preferably contain from about 20 to about 70% by weight monomers and will more preferably contain from about 40 to about 50% by weight monomers.

The free radical emulsion polymerizations utilized in synthesizing the rubbery polymer are typically conducted at a temperature which is within the range of about 10° C. to about 95° C. In most cases, the polymerization temperature utilized will vary between about 20° C. and about 80° C. The polymerization is carried out as a two-step batch process. In the first step, a seed polymer containing latex is synthesized.

This is done by polymerizing (a) butyl acrylate, or optionally a mixture of butyl acrylate and 2-ethylhexyl acrylate containing up to about 40% 2-ethylhexyl acrylate, (b) at least one member selected from the group consisting of methyl methacrylate, ethyl methacrylate, methyl acrylate, and ethyl acrylate, (c) optionally, about 0 to about 40% of alkoxy ethyl me(acrylate), (d) acrylonitrile, (e) a crosslinking agent wherein (f) about 1 to about 10% of a reactive cure site (co)monomer containing hydroxyl groups, glycidyl groups, carboxylic acid groups, or unsaturated cure site is incorporated during emulsion polymerization onto said rubbery polymer.

The seed polymer containing latex is typically prepared by the polymerization of a monomer mixture which contains about 40 to about 90% by weight butyl acrylate, or optionally, a mixture of butyl acrylate and 2-ethylhexyl acrylate containing up to about 40% 2-ethylhexyl acrylate, from about 5 to about 35% by weight methyl methacrylate, ethyl methacrylate, methyl acrylate, or ethyl acrylate, from about 2 to about 30% by weight acrylonitrile, and from about 0.25 to 6% by weight of the crosslinking agent wherein from about 0.1 to about 10% by weight of a (co)monomer containing hydroxyl groups, glycidyl groups, carboxylic acid groups, or unsaturated cure site is incorporated during emulsion polymerization onto said rubbery polymer.

It is typically preferred for the monomeric component utilized in the first step to include about 50 to about 85% by weight butyl acrylate, or optionally a mixture of butyl acrylate and 2-ethylhexyl acrylate containing up to about 40% 2-ethylhexyl acrylate, from about 5 to about 30% by weight ethyl acrylate, ethyl methacrylate, methyl acrylate, or methyl methacrylate, from about 4 to about 28% by weight acrylonitrile, and from about 0.5 to about 4% by weight of the crosslinking agent wherein (g) from about 0.1 to about 10% by weight of a (co)monomer containing hydroxyl groups, glycidyl groups, carboxylic acid groups, or unsaturated cure site is incorporated during emulsion polymerization onto said rubbery polymer.

It is generally more preferred for the monomer charge composition used in synthesizing the seed polymer latex to contain from about 60% to about 80% by weight butyl acrylate, or optionally a mixture of butyl acrylate and 2-ethylhexyl acrylate containing up to about 40% 2-ethylhexyl acrylate, from about 5 to about 25% by weight methyl methacrylate, ethyl methacrylate, methyl acrylate, or ethyl acrylate, from about 5 to about 25% by weight acrylonitrile, and from about 1 to about 3% by weight crosslinking agent wherein (g) from about 0.1 to about 10% by weight of a (co)monomer containing hydroxyl groups, glycidyl groups, carboxylic acid groups, or unsaturated cure site is incorporated during emulsion polymerization onto said rubbery polymer.

After the seed polymer latex has been prepared, styrene monomer, additional acrylonitrile monomer, and additional crosslinking agent is added to the seed polymer containing latex. As a general rule, from about 4 parts by weight to about 30 parts by weight of styrene, from about 1 part by weight to about 20 parts by weight of additional acrylonitrile, and from about 0.01 to 2 parts by weight of the crosslinking agent will be added to the seed polymer per 100 parts dry weight of the seed polymer. In this second stage of the polymerization, it is preferred to add from about 6 parts by weight to about 22 parts by weight of styrene, from about 3 parts by weight to about 12 parts by weight of acrylonitrile, and from about 0.05 parts by weight to 1 part by weight of the crosslinking agent. It is typically more preferred for from about 10 parts by weight to about 17 parts by weight of styrene, from about 4 parts by weight to about 8 parts by weight of acrylonitrile, and from about 0.1 parts by weight to about 0.5 parts by weight of the crosslinking agent to be added to the seed polymer latex to initiate the second phase of the polymerization.

A wide variety of crosslinking agents can be utilized in carrying out the polymerizations to produce the rubbery polymer. Some representative examples of crosslinking agents which can be utilized include difunctional acrylates, difunctional methacrylates, trifunctional acrylates, trifunctional methacrylates, and divinylbenzene. 1,4-butanediol dimethacrylate has proven to be particularly useful as the crosslinking agent.

The rubbery polymer can be made by the two-step batch, semi-continuous, or continuous emulsion polymerization process. In most cases, the polymerization will be continued until a high monomer conversion has been reached. At this point, the rubbery polymer made by the two-step polymerization process is recovered from the emulsion (latex) after the optional deodorizing step. This can be accomplished by utilizing standard coagulation techniques. For instance, coagulation can be accomplished by the addition of salts, acids, or both to the latex.

After the rubbery polymer is recovered by coagulation, it can be washed to further reduce odors. This can be accomplished by simply pouring or spraying water on the rubbery polymer. The rubbery polymer can also be washed by putting it in a water bath which will further reduce odor. After being washed, the rubbery polymer is generally dried. It is sometimes advantageous to convert the rubbery polymer into a powder to facilitate its usage. In this case, it will be beneficial to add a partitioning agent to the rubbery polymer. Some representative examples of partitioning agents which can be employed include calcium carbonate, emulsion polyvinyl chloride, and silica. Calcium carbonate is a highly desirable partitioning agent which can be utilized in such applications.

The rubbery polymers made by the process of this invention are comprised of an inner core and an outer shell. The inner core is comprised of a polymeric structure having repeat units which are derived from (a) butyl acrylate, (b) a member selected from the group consisting of methyl methacrylate, ethyl methacrylate, methyl acrylate, and ethyl acrylate, (c) optionally, an alkoxy ethyl acrylate or an alkoxy ethyl methacrylate, (d) acrylonitrile, (f) the cross-linking agent, and (g) the monomer containing reactive cure sites are polymerized in the first polymerization step. The outer core is comprised of a polymeric structure having repeat units which are derived from (d) acrylonitrile, styrene, and the cross-linking agent. The outer core is void of repeat units which are derived from methyl methacrylate.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

Comparative Example

In this experiment, a rubbery polymer was made in a 10 liter stainless steel reactor. The reactor was equipped with an axially flow turbine agitator which was operated at 450 rpm (revolutions per minute). The reactor was charged with 6348.68 grams of water, 72.8 grams of a half ester maleate soap (made with a $C_{16}$ fatty alcohol), 2.73 grams of sodium dodecylbenzenesulfonate, 31.2 grams of a 50 percent aqueous potassium hydroxide solution, 5.2 grams of sodium pyrophosphate, 1837.68 grams of n-butylacrylate, 218.4 grams of acrylonitrile, 109.2 grams of methylmethacrylate, 44.2 grams of 1,4-butanediol dimethacrylate, 2.08 grams of t-dodecylmercaptan, 1.56 grams of triethanol amine, and 6.5 grams of potassium persulfate were initially charged into the reactor. A temperature of about 35° C. was maintained during the first stage of the polymerization. When a solids content of about 20% was reached the reaction temperature was increased to about 60° C. and a temperature of about 60° C. was maintained throughout the polymerization until the total solids content of about 25% was achieved. This first stage of polymerization was carried out for a period of about 2.5 hours. This first stage polymerization resulted in the production of seed polymer latex which was used in the second step of the polymerization.

In the second step of the polymerization, 124.8 grams of acrylonitrile, 242 grams of styrene, 4.68 grams of divinylbenzene, and 0.78 grams of t-dodecylmercaptan were charged into the reactor containing the seed polymer latex. The polymerization proceeded until a solids content of about 30% was reached. The latex made was subsequently coagulated and a dry rubber was recovered.

Example 2

In this experiment, a rubbery polymer was synthesized in a 10 litres reactor utilizing the technique of this invention. In the procedure employed 6348.68 grams of water, 72.8 grams of hexadecylmonomaleate, 9.1 grams of a 30% solution of sodium dodecylbenzene sulfonate, 31.2 grams of a 50% aqueous potassium hydroxide solution, 5.2 grams of sodium pyrophosphate, 8.4 grams of acrylonitrile, 4.2 grams of methyl methacrylate, 71.4 grams of n-butyl acrylate, 39 grams of glycidyl methacrylate, 26 grams of 1,4-butanediol dimethacrylate, 2.08 grams of t-dodecylmercaptan, 1.56 grams of triethanol amine, and 6.5 grams of potassium persulfate were initially charged into the reactor. A temperature of about 35° C. was maintained during the first stage of the polymerization. When a solids content of about 20% was reached the reaction temperature was increased to about 60° C. and 124.8 grams of additional acrylonitrile, 242 grams of styrene, 4.88 grams of divinylbenzene, and 0.78 grams of t-dodecylmercaptan were charged into the reactor. After the polymerization was completed, the latex made was coagulated and a rubber was recovered.

Example 3

The procedure used in Example 2 was repeated in this experiment except that 44.2 grams (instead of 26 grams) of 1,4-butanediol dimethacrylate was charged into the reactor.

Example 4

The procedure used in Example 2 was repeated in this experiment, except that 44.2 grams (instead of 26 grams) of 1,4-butanediol dimethacrylate and 130 grams of dicyclopentenyloxyethyl methacrylate (instead of 39 grams of glycidyl methacrylate) were charged into the reactor. Antioxidants, such as WINGSTAY L® or WINGSTAY K®, in emulsion form or in dispersion form can be used to stabilize the rubbery polymer during drying and storage. The latex made was subsequently coagulated and a dry rubber was recovered.

Example 5

The procedure used in Example 4 was repeated in this experiment, except that 130 grams of diallyl phthalate was used to replace the dicyclopentenyloxyethyl methacrylate.

Examples 6-9

In these series of experiments, leathery compositions were made by blending the rubbery polymers made in Examples 1 and 3 or other rubbery polymers (CHEMIGUM® nitrile rubber) into PVC. In the procedure used, 40 parts of the rubbery polymers were blended into 100 parts of the PVC. The blends made also included 80 parts of DOP and 3 parts of Ba/Zn. The blends were made by mixing the components in a mill at 180°

C. for 6 minutes and then pressing them into samples at 180° C. The samples made were then tested to determine their physical properties.

The physical properties of the samples made are reported in Table I. The blend made in Example 6 contained Eliokem CHEMIGUM®P83 nitrile rubber, the blend of Example 7 contained Eliokem CHEMIGUM®P35 nitrile rubber, the blend of Example 8 contained the rubber composition of Example 1, and the blend of Example 9 contained the rubber composition of Example 3.

As it can be seen in Table I, all the rubbery polymers made in Examples 1 and 3 could be made into leathery compositions, which had good physical properties compared to the CHEMIGUM® nitrile rubber.

TABLE I

| Examples | Shore A Hardness | Tensile Strength | Elongation | Modulus 50% MPa | Modulus 100% MPa | Compression set 22 h at 70° C. |
|---|---|---|---|---|---|---|
| Example 6 | 64 | 13 MPa | 500% | 3.3 | 5.8 | 58.2% |
| Example 7 | 64 | 9.7 MPa | 417% | 2.8 | 4.9 | 51.4% |
| Example 8 | 65 | 11.8 MPa | 352% | 2.2 | 4.5 | 56.9% |
| Example 9 | 65 | 10.9 MPa | 326% | 2.3 | 4.5 | 56.4% |

Examples 10-13

In this series of experiments, leathery compositions were made by blending the rubbery polymers made in Examples 1, 4 and 5 into PVC. The procedure of Examples 6-9 was repeated except 100 parts of the rubbery polymers was blended into 100 parts of the PVC.

The physical properties of the samples made are reported in Table II. The blend made in Example 10 contained the rubber composition of Example 1, the blend of Example 11 contained rubber composition of Example 4, the blend of Example 12 contained the rubber composition of Example 5, and the blend of Example 13 contained the rubber composition of Example 4 and 10 parts of LOTADER® AX 8900® terpolymer per 100 parts of the rubbery polymer as a crosslinking agent.

TABLE II

| | Examples | | | |
|---|---|---|---|---|
| | 10 | 11 | 12 | 13 |
| Hardness Shore A | 56 | 56 | 57 | 57 |
| Tensile Strength (MPa) | 11.5 | 10 | 9.8 | 10.3 |
| Elongation at break % | 282 | 239 | 205 | 232 |
| Modulus at 50% (MPa) | 1.8 | 2.0 | 2.0 | 2.2 |
| Modulus at 100% (MPa) | 3.5 | 3.8 | 3.9 | 4.2 |
| Tear Strength (kN/m) | 23 | 19.2 | 19.4 | 20.6 |
| Compression set 22 hrs at 70° C. | 54.6 | 48.6 | 45 | 42 |

As it can be seen from Table II, the compression set behavior of the blends made with the rubber composition polymer of this invention was better than was that of the control.

Examples 14-18

In these series of experiments, rubbery polymer was blended into metallocene catalyzed polyethylene. In the procedure, 60 parts of the rubbery polymer was blended at a temperature of 180° C. with 40 parts of ENGAGE® 8100 polyolefin elastomer in a Haake Rheocord 90 operated at 60 rotations per minute over a period of 30 minutes. Blends were pressed into samples at 180° C. The samples were then tested to determine their physical properties.

The physical properties of the samples made are reported in Table III. The blend made in Example 14 contained rubber composition of Example 1. Example 15 was a compatibilized blend of the rubber composition of Example 1 and 10 parts of LOTADER® 8900 terpolymer percent parts of the rubber composition polymer. For comparative purposes, a second blend was made with the rubber composition of Example 3 without including the compatibilizing polymer in Example 16, or with 10 parts of LOTADER® 8900 terpolymer per 100 parts of the rubber composition polymer in Example 17 or with 10 parts of ELVAX® 360 specialty EVA resin per 100 parts of the rubber composition in Example 18.

TABLE III

| | Examples | | | | |
|---|---|---|---|---|---|
| | 14 | 15 | 16 | 17 | 18 |
| Shore A Hardness | 60 | 63 | 60 | 63 | 62 |
| Tensile Strength (MPa) | 4.3 | 6.6 | 4.1 | 10.4 | 4.8 |
| Elongation at break (%) | 700 | 500 | 475 | 490 | 750 |
| Modulus at 50% (MPa) | 1.7 | 1.9 | 1.6 | 1.9 | 1.8 |
| Modulus at 100% (MPa) | 2.6 | 2.8 | 2.5 | 3 | 2.7 |
| Tear Strength (kN/m) | 26 | 25 | 24 | 43 | 27 |

As it can be seen from Table III, the physical properties of the blends made with the rubber composition polymer of this invention are better than those of the control that did not contain any monomers containing glycidyl functional groups.

Examples 19-25

In this series of experiments, the rubbery polymer was blended into high density polyethylene HDPE having a melt flow index (MFI) of about 4. In the procedure utilized 70 parts of the rubbery polymer was blended at a temperature of 180° C. with 30 parts of KS10100 high density polyethylene (HDPE) from Dow Plastics in a Haake Rheocord 90 operated at 60 rpm over a period of 30 minutes. The blends were pressed into samples at 180° C. The samples were then tested to determine their physical properties.

The physical properties of the samples made are reported in Table IV. The blend made in Example 19 contained the rubber composition of Example 1. Example 20 was a compatibilized a blend of the rubber composition of Examples 1 and 10 parts of ELVAX® 360 specialty EVA resin, while Example 21 was a compatibilized blend of the rubber composition of Example 1 and 10 parts of LOTADER® AX 8900 terpolymer. For comparative purpose, a second blend was made with the rubber composition of Example 2 without including the compatibilizing polymer in Example 22 or with 10 parts of ELVAX® 360 specialty EVA resin per 100 parts of the rubber composition in Example 23. Otherwise, Example 24 was the blend of Example 16 including 10 parts of ELVAX® 670 specialty EVA resin and Example 25 was the blend of Example 16 including 10 parts of LOTADER® AX8900 terpolymer.

TABLE IV

| | Examples | | | | | | |
|---|---|---|---|---|---|---|---|
| | 19 | 20 | 21 | 22 | 23 | 24 | 25 |
| Tensile at break (MPa) | 5.1 | 5.2 | 9.5 | 5.6 | 9.8 | 9.3 | 12.6 |
| Elongation at break % | 74 | 147 | 270 | 71 | 203 | 192 | 282 |
| Modulus 50% (MPa) | 5.4 | 5.1 | 6.4 | 5.2 | 6.6 | 6.5 | 6.3 |
| Modulus 100% (MPa) | — | — | — | — | 7.9 | 7.8 | 7.8 |
| Tear strength kN/m | 37 | 34 | 54 | 28 | 50 | 44 | 54 |

As it can be seen from Table IV, physical properties of compatibilized blends made with the rubber composition polymer of this invention are better than was the control that did not contain any monomers with glycidyl functional groups.

Examples 26-29

In these series of experiments, the same procedure as utilized in Examples 19-25 was repeated, except 40 parts of the rubbery polymer was blended with 60 parts of HDPE KS 10100 from Dow Plastics and 10 parts of the compatibilizing polymer per 100 parts of the rubber composition polymer. Examples 26 and 27 were compatibilized blends of the rubber composition of Examples 1 and 2, respectively, and 10 parts of LOTADER® AX 8900 terpolymer percent parts of the rubber composition polymer. Examples 28 and 29 were compatibilized blends of the rubber composition of Examples 1 and 2, respectively, and 10 parts of ELVAX® 360 specialty EVA resin percent parts of the rubber composition polymer. The physical properties of the samples made are reported in Table V.

TABLE V

| | Examples | | | |
|---|---|---|---|---|
| | 26 | 27 | 28 | 29 |
| Tensile at break (MPa) | 8.7 | 12.6 | 10.4 | 12.7 |
| Elongation at break % | 287 | 367 | 51 | 184 |
| Modulus 50% (MPa) | — | 12.1 | 9.7 | 12.7 |
| Modulus 100% (MPa) | — | 12 | — | 12.6 |
| Tear strength kN/m | 113 | 112 | 69 | 80 |

As it can be seen in Table V, physical properties of the compatibilized blends made with the rubber composition polymer of this invention are better than those of the control for both types of compatibilizing polymers (LOTADER® AX 8900 terpolymer as well as ELVAX® 360 specialty EVA resin).

While certain representative embodiments and details have been shown for the purpose of illustrating the subject invention, it will be apparent to those skilled in this art that various changes and modifications can be made therein without departing from the scope of the subject invention.

What is claimed is:

1. A rubbery polymer having improved properties, which is comprised of art inner core and an outer shell, wherein the inner core is comprised of a polymeric structure having repeat units which are derived from a mixture of (a) butyl acrylate, (b) a member selected from the group consisting of methyl methacrylate, ethyl methacrylate, methyl acrylate, and ethyl acrylate, (c) optionally, an alkoxy ethyl acrylate or an alkoxy ethyl methacrylate, (d) acrylonitrile, (f) a cross-linking agent selected from the group consisting of difunctional acrylates, difunctional methacrylates, trifunctional acrylates, trifunctional methacrylates, divinyl benzene, and 1,4-butanediol dimethacrylate, and (g) a monomer containing reactive cure sites, wherein the reactive cure sites are glycidyl groups, wherein the outer shell is comprised of a polymeric structure having repeat units which are derived from (d) about 4 weight percent to about 30 weight percent acrylonitrile, (e) styrene, and (f) additional cross-linking agent, wherein the outer shell is void of repeat units which are derived from methyl methacrylate.

2. The rubbery polymer as specified in claim 1 which is comprised of repeat units which are derived from (a) about 40 to about 80% by weight butyl acrylate, or optionally a mixture of butyl acrylate and 2-ethylhexyl acrylate containing up to 40% by weight 2-ethylhexyl acrylate, (b) from about 5 to about 35% by weight methyl methacrylate, ethyl methacrylate, methyl acrylate, or ethyl acrylate, (c) optionally, about 0 to about 40% by weight of an alkoxy ethyl acrylate or an alkoxy ethyl methacrylate, (d) from about 4 to about 30% by weight acrylonitrile, (e) from about 3 to about 25% by weight styrene, (f) from about 0.25 to about 8% by weight of a crosslinking agent, and (g) from about 1% to about 10% by weight of the monomer containing reactive cure sites, wherein the outer shell consists of repeat units that are derived from acrylonitrile, styrene, and the additional cross-linking agent.

3. The rubbery polymer as specified in claim 1 which contains repeat units which are derived from (a) about 50 to about 80% by weight butyl acrylate, or optionally a mixture of butyl acrylate and 2-ethylhexyl acrylate containing up to about 40% by weight 2-ethylhexyl acrylate, (b) from about 3 to about 25% by weight of at least one member selected from the group consisting of methyl methacrylate, ethyl methacrylate, methyl acrylate, and ethyl acrylate, (c) optionally about 0 to about 40% by weight of an alkoxy ethyl acrylate or an alkoxy ethyl methacrylate, (d) from about 6 to about 30% by weight acrylonitrile, (e) from about 5 to about 18% by weight styrene,(f) from about 0.5 to about 4% by weight of a crosslinking agent, and (g) from about 1% to about 8% by weight of the monomer containing reactive cure sites.

4. The rubbery polymer as specified in claim 1 which contains repeat units which are derived from (a) from about 55 to about 75% by weight butyl acrylate, or optionally a mixture of butyl acrylate and 2-ethylhexyl acrylate containing up to about 40% by weight 2-ethylhexyl acrylate, (b) from about 5 to about 20% by weight of at least one member selected from the group consisting of methyl methacrylate, ethyl methacrylate, methyl acrylate, and ethyl acrylate, (c) optionally, about 0 to about 40% by weight of an alkoxy ethyl acrylate or an alkoxy ethyl methacrylate, (d) from about 10 to about 25% by weight acrylonitrile, (e) from about 8 to about 14% by weight styrene, (f) from about 1 to about 3% by weight of a crosslinking agent, and (g) from about 2% to about 6% by weight of the monomer containing reactive cure sites.

5. The rubbery polymer as specified in claim 1 wherein the monomer containing reactive cure sites is selected from the group consisting of glycidyl methacrylate and allyl glycidyl ether.

6. A leathery composition which is useful in automotive applications wherein the leathery composition is comprised of (1) a thermoplastic, (2) a plasticizer, and (3) the rubbery polymer as specified in claim 1.

7. The leathery composition as specified in claim 6 wherein the thermoplastic resin is polyvinyl chloride.

8. The leathery composition as specified in claim 6 wherein the thermoplastic resin is a polyolefin.

9. The leathery composition as specified in claim 8 wherein the polyolefin is high density polyethylene.

10. The leathery composition as specified in claim 8 wherein the polyolefin is a metallocene catalyzed polyolefin.

11. A process for preparing a rubbery polymer which can be blended with thermoplastics to make leathery compositions having good heat and ultraviolet light resistance, said process comprising the steps of (1) polymerizing a mixture of (a) butyl acrylate, or optionally a mixture of butyl acrylate and 2-ethylhexyl acrylate containing up to about 40% by weight 2-ethylhexyl acrylate, (b) at least one member selected from the group consisting of methyl methacrylate, ethyl methacrylate, methyl acrylate, and ethyl acrylate, (c) optionally about 0% to about 40% of alkoxy ethyl methacrylate, (d) acrylonitrile, and (e) a crosslinking agent selected from the group consisting of difunctional acrylates, difunctional methacrylates, trifunctional acrylates, trifunctional methacrylates, divinyl benzene, and 1,4-butanediol dimethacrylate; wherein about 1% to about 10% by weight of a monomer containing reactive cure is incorporated into the rubbery polymer under emulsion polymerization conditions to produce a seed polymer containing latex, wherein the monomer containing reactive cure sites contains glycidyl groups; (2) adding a monomer mixture consisting of (a) styrene, (b) additional acrylonitrile, and (c) additional crosslinking agent to the seed polymer containing latex under emulsion polymerization conditions which result in the formation of an emulsion containing the rubbery polymer, wherein no additional methyl methacrylate is added to the seed polymer latex; and (3) recovering the rubbery polymer from the emulsion containing the rubbery polymer.

12. The process as specified in claim 11 wherein the polymerization is a free radical emulsion polymerization.

13. The process as specified in claim 12 wherein the polymerization is conducted at a temperature which is within the range of about 10° C. to about 95° C.

14. The process as specified in claim 13 wherein from about 6 parts by weight to about 22 parts by weight of the styrene, about 3 parts by weight to about 12 parts by weight of the additional acrylonitrile, and about 0.05 parts by weight to about 1 part by weight of the crosslinking agent are added to the seed polymer latex in step (2).

15. The process as specified in claim 14 wherein the crosslinking agent is 1,4-butanediol dimethacrylate.

16. The process as specified in claim 15 wherein the polymerization is conducted at a temperature which is within the range of 20° C. to 80° C.

17. The process as specified in claim 16 wherein from 10 parts by weight to 17 parts by weight of the styrene, 4 parts by weight to 8 parts by weight of the additional acrylonitrile, and 0.1 parts by weight to 0.5 part by weight of the 1,4-butanediol dimethacrylate are added to the seed polymer latex in step (2).

18. A rubbery polymer having improved properties, which is comprised of an inner core and an outer shell, wherein the inner core is comprised of a polymeric structure having repeat units which are derived from a mixture of (a) butyl acrylate, (b) a member selected from the group consisting of methyl methacrylate, ethyl methacrylate, methyl acrylate, and ethyl acrylate, (c) optionally, an alkoxy ethyl acrylate or an alkoxy ethyl methacrylate, (d) acrylonitrile, (f) a cross-linking agent selected from the group consisting of difunctional acrylates, difunctional methacrylates, trifunctional acrylates, trifunctional methacrylates, divinyl benzene, and 1,4-butanediol dimethacrylate, and (g) a monomer containing reactive cure sites selected from the group consisting of dicyclopentenyl acrylate and dicyclopentenyloxyethyl methacrylate, wherein the outer shell is comprised of a polymeric structure having repeat units which are derived from (d) about 4 weight percent to about 30 weight percent acrylonitrile, (e) styrene, and (f) additional cross-linking agent, wherein the outer core is void of repeat units which are derived from methyl methacrylate.

19. The rubbery polymer specified in claim 18 wherein the inner core consists of a polymeric structure having repeat units which are derived from (a) butyl acrylate, (b) a member selected from the group consisting of methyl methacrylate, ethyl methacrylate, methyl acrylate, and ethyl acrylate, (c) optionally, an alkoxy ethyl acrylate or an alkoxy ethyl methacrylate, (d) acrylonitrile, (f) a cross-linking agent selected from the group consisting of difunctional acrylates, difunctional methacrylates, trifunctional acrylates, trifunctional methacrylates, divinyl benzene, and 1,4-butanediol dimethacrylate, and (g) a monomer containing reactive cure sites selected from the group consisting of dicyclopentenyl acrylate and dicyclopentenyloxyethyl methacrylate, and wherein the outer shell consists of a polymeric structure having repeat units which are derived from (d) about 4 weight percent to about 30 weight percent acrylonitrile, (e) styrene, and (f) additional cross-linking agent.

20. The rubbery polymer as specified in claim 19 which contains repeat units which are derived from (a) about 50 to about 80% by weight butyl acrylate, or optionally a mixture of butyl acrylate and 2-ethylhexyl acrylate containing up to about 40% by weight 2-ethylhexyl acrylate, (b) from about 3 to about 25% by weight of at least one member selected from the group consisting of methyl methacrylate, ethyl methacrylate, methyl acrylate, and ethyl acrylate, (c) optionally about 0 to about 40% by weight of an alkoxy ethyl acrylate or an alkoxy ethyl methacrylate, (d) from about 6 to about 30% by weight acrylonitrile, (e) from about 5 to about 18% by weight styrene, (f) from about 0.5 to about 4% by weight of a crosslinking agent, and (g) from about 1% to about 8% by weight of the monomer containing reactive cure sites.

\* \* \* \* \*